(12) United States Patent
Kitaguchi et al.

(10) Patent No.: US 9,205,770 B2
(45) Date of Patent: Dec. 8, 2015

(54) DUMP TRUCK

(71) Applicant: Hitachi Construction Machinery Co., Ltd., Tokyo (JP)

(72) Inventors: Atsushi Kitaguchi, Tsuchiura (JP); Takayuki Satou, Kashiwa (JP); Kazunori Ishihara, Mito (JP); Takeshi Iwaki, Kasumigaura (JP); Jun Ikeda, Tsuchiura (JP); Yasuki Kita, Toride (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/428,012

(22) PCT Filed: Jul. 25, 2013

(86) PCT No.: PCT/JP2013/004531
§ 371 (c)(1),
(2) Date: Mar. 13, 2015

(87) PCT Pub. No.: WO2014/049927
PCT Pub. Date: Apr. 3, 2014

(65) Prior Publication Data
US 2015/0239385 A1 Aug. 27, 2015

(30) Foreign Application Priority Data

Sep. 25, 2012 (JP) ................................. 2012-210852

(51) Int. Cl.
*B60P 1/16* (2006.01)
*B60P 1/28* (2006.01)

(52) U.S. Cl.
CPC .... *B60P 1/16* (2013.01); *B60P 1/28* (2013.01)

(58) Field of Classification Search
CPC ................ B60P 1/28; B60P 1/16; B60P 1/04; B60P 1/286
USPC ......... 298/17 R, 19 R, 22 P, 22 R; 296/183.2, 296/184.1
See application file for complete search history.

(56) References Cited

U.S. PATENT DOCUMENTS

| 5,555,699 A | 9/1996 | Borthick et al. |
| 5,560,684 A * | 10/1996 | Gilmore ...................... 298/22 R |
| 2008/0018135 A1 | 1/2008 | Risner |

FOREIGN PATENT DOCUMENTS

| GB | 2444249 A | 6/2008 |
| JP | 2007-176269 A | 7/2007 |

* cited by examiner

*Primary Examiner* — Stephen Gordon
(74) *Attorney, Agent, or Firm* — Mattingly & Malur, PC

(57) ABSTRACT

A dump truck is provided with a frame, hinge pins and a body (5). The body is provided on a lower surface of a floor board (11*a*) thereof with a rail (12) along a longitudinal direction of the frame. The rail is a hollow structure member comprised of two side rail plates (12*a*) and a bottom rail plate (12*b*). The two side rail plates (12*a*) extend downwardly from the lower surface of the floor board (11*a*) of the body and oppose each other with an interval therebetween in a lateral direction of the frame, and the bottom rail plate (12*b*) is arranged in contact with respective lower end surfaces (12*a*-1) of these two side rail plates (12*a*). The dump truck (1) satisfies a relationship of $T_s < T_b < T_f$, where $T_s$ is a thickness of the side rail plates, $T_b$ is a thickness of the bottom rail plate, and $T_f$ is a thickness of a top frame plate (2*a*-2) of the frame.

3 Claims, 11 Drawing Sheets

DUMP TRUCK

TECHNICAL FIELD

The present invention relates to a dump truck for hauling an object such as earth or sand.

BACKGROUND ART

A dump truck is generally provided with a frame having four wheels disposed thereon. Above a front section of the frame, an operator's cab and control box are arranged. On the frame, a body is mounted extending over the frame from a middle to a rear of the frame.

Via hinge pins attached to a rear of the frame and hoist cylinders attached on the frame at locations forward of the hinge pins, the body is connected to the frame. In association with an extension or contraction of the hoist cylinders, the body pivots in an upward or downward direction (rises or lowers) about the hinge pins.

On the body of the dump truck, an object to be hauled, such as earth, sand or crushed stone, is loaded in a heap, for example, by a hydraulic excavator or the like. The dump truck is constructed such that by changing the body from a lowered position to a raised position, the object loaded on the body can be unloaded (see, for example, Patent Citations 1 and 2).

The body is provided with a payload section formed by a floor board forming a floor, a front board located on a front side of the floor board and forming a front wall, and a pair of side boards located on opposite sides of the floor board. To an upper part of the front board of the body, a canopy is connected extending forward such that the canopy covers the operator's cab and control box.

Attached to a lower surface of the floor board of the body is a pair of rails, which are arranged extending in a longitudinal direction of the frame. Each rail is a hollow box-shaped structure member comprised of two side rail plates and a bottom rail plate. The two side rail plates extend downwardly from the floor board of the body, and the bottom rail plate is in contact with respective lower end surfaces of the two side rail plates. It is to be noted that the bottom rail plate is often provided with rubber pads as cushioning members. These rubber pads serve to prevent vibrations of the body during traveling, and also to absorb impacts to the frame upon loading earth or sand on the body.

On the lower surface of the floor board of the body, a plurality of laterally-extending stiffeners (reinforcing members) are also attached at intervals in the longitudinal direction such that these plural stiffeners intersect with the paired rails. It is to be noted that each stiffener is a structure member comprised of a channel steel. The floor board, front board, paired side boards, canopy, the paired rails and individual stiffeners of the body have been joined together by welding. The rigidity of the floor board of the body is assured by the paired rails and the plural stiffeners.

When an object to be hauled is loaded in a heap in the payload section of the body, a high load is applied to the body from the object to be hauled. The load applied to the body is received via the floor board of the body at parts connected to the rails and parts connected to the hinge pins, specifically hinge brackets. The load applied to the rails is borne by the frame which supports the rails. On the other hand, the load applied to the hinge brackets of the body is borne by the frame via the hinge pins.

Upon raising the body to unload the hauled object, a high load is applied to the hinge brackets, and therefore, relatively thick plates are used for the hinge brackets to assure high rigidity for them. On the other hand, the rails are arranged on the lower surface of the floor board of the body over a wide range extending in the longitudinal direction, and therefore, relatively thin plates are assembled into box structures to assure rigidity for the rails.

CITATION LIST

Patent Literature

[PTL 1] JP-A-2007-176269
[PTL 2] U.S. Pat. No. 5,555,699

DISCOURSE OF INVENTION

Technical Problem

In a position that the body rests on the frame (in the position of a lowered posture), on the other hand, each rail receives a reaction force from the frame (via the corresponding rubber pads), and therefore, a force is applied to the rail as if it would be crushed in a vertical direction. As illustrated in FIG. 11, with joints (specifically, weld seams) of the rail and the associated side rail plates serving as supports, the bottom rail plate is hence deformed such that its center becomes a top part. A large bending moment, therefore, acts on the center (an upwardly-convex top) of the bottom rail plate. As a consequence, a large bending stress occurs, leading to a potential problem that a crack may occur in a central part of the bottom rail plate. In addition, a large deflection angle occurs at each of the joints of the rail and the side rail plates so that a large stress also occurs at the joint. The joints of the bottom rail plate and the side rail plates are, therefore, positions where breakage is likely to occur.

To prevent the occurrence of such breakage at the joints, the joints may be increased in plate thickness to lower the stress. This approach, however, leads to an increase in the mass of the body, thereby raising problems such as a decrease in authorized payload weight, a deterioration in travel fuel economy, a reduction in the service life of tires, and the like. Such an approach is, therefore, not expedient.

With the above-mentioned actual situation of the conventional technologies in view, the present invention has as an object thereof the provision of a dump truck enhanced in rail rigidity and improved in structural reliability while promoting mass savings by making, as fewer as possible, positions where one or more rails arranged on a floor board of a body are increased in plate thickness.

Solution to Problem

To achieve the above-described object, the present invention provides a dump truck provided with a frame (2) having a top frame plate, hinge pins arranged on a rear part of the frame, and a body mounted tiltably in an up-and-down direction relative to the frame via the hinge pins, characterized in that the body is provided on a lower surface of a floor board thereof with a rail along a longitudinal direction of the frame, the rail is a hollow structure member comprised of two side rail plates, which extend downwardly from the lower surface of the floor board of the body and oppose each other with an interval therebetween in a lateral direction of the frame, and a bottom rail plate, which is arranged in contact with respective lower end surfaces of the two side rail plates, and the dump truck satisfies a relationship of $Ts<Tb<Tf$, where Ts is a thickness of the side rail plates, Tb is a thickness of the bottom rail plate, and Tf is a thickness of the top frame plate of the frame.

According to the present invention, the thickness Tb of the bottom rail plate is set greater than the thickness Is of the side rail plates, so that the rail is provided with enhanced rigidity. Even when the rail receives a reaction force from the frame, bending deformations of the bottom rail plate in the up-and-down direction become smaller. Accordingly, stresses at the joints of the bottom rail plate and the side rail plates are lowered, thereby making it possible to prevent breakage. As the thickness Is of the side rail plates is set smaller than the thickness Tb of the bottom rail plate, mass savings can be promoted compared with making the thickness of the rail greater as a whole.

Incidentally, a body is a consumable component the use of which hence needs periodic repair or replacement. However, a frame is not positioned as such a consumable component. Even if the repair or replacement of the body is unavoidable, it is, therefore, not desired to come to such a situation that the frame would have to be repaired or replaced. In the present invention, the thickness Tf of the frame has thus been set greater than the thickness Tb of the bottom rail plate. By doing so, the likeliness of breakage of the frame before the body is reduced, and at the time of regular periodic maintenance, it is thus only necessary to repair or replace the body alone as needed.

Because the dump truck according to the present invention is constructed to satisfy the relationship of Ts<Tb (Ts: the thickness of the side rail plates, Tb: the thickness of the bottom rail plate) as described above, it is only necessary to make the bottom rail plate greater in thickness than the side rail plates upon providing the rail with enhanced rigidity. It is, therefore, possible to provide the rail with enhanced rigidity while promoting mass savings for the rail. This also contributes to providing the body with longer service life. The dump truck according to the present invention is also constructed to satisfy the relationship of Tb<Tf (Tb: the thickness of the bottom rail plate, Tf: the thickness of the top frame plate of the frame), and therefore, is also excellent in the ease of maintenance.

In the above-described invention, the bottom rail plate may be provided with plural rubber pads such that the rubber pads are in contact with the frame when the body is in a position resting on the frame, and the rail may be constructed to satisfy the relationship of Ts<Tb<Tf as far as an area where the bottom rail plate is provided with the plural rubber pads is concerned. When constructed as described above, the thickness of the bottom rail plate does not need to be increased at parts of the entire rail other than the area where the plural rubber pads are arranged. It is, accordingly, possible to keep at a minimum the increase in the mass of the body.

In the above-described invention, the frame may be provided with plural rubber pads such that the rubber pads are in contact with the bottom rail plate when the body is in a position resting on the frame, and the rail may be constructed to satisfy the relationship of Ts<Tb<Tf as far as an area where the bottom rail plate comes into contact with the plural rubber pads is concerned. When constructed as described above, the thickness of the bottom rail plate does not need to be increased at parts of the entire rail other than the area where the bottom rail plate comes into contact with the plural rubber pads. It is, accordingly, possible to keep at a minimum the increase in the mass of the body.

Advantageous Effects of Invention

Owing to the inclusion of the above-described construction, the dump truck according to the present invention can be enhanced in rail rigidity and improved in structural reliability while promoting mass savings by making, as fewer as possible, positions where the rail arranged on the floor board of the body is increased in plate thickness.

MODES FOR CARRYING OUT THE INVENTION

Embodiments for carrying out the dump truck according to the present invention will hereinafter be described based on the drawings.

First Embodiment

Figure 1:
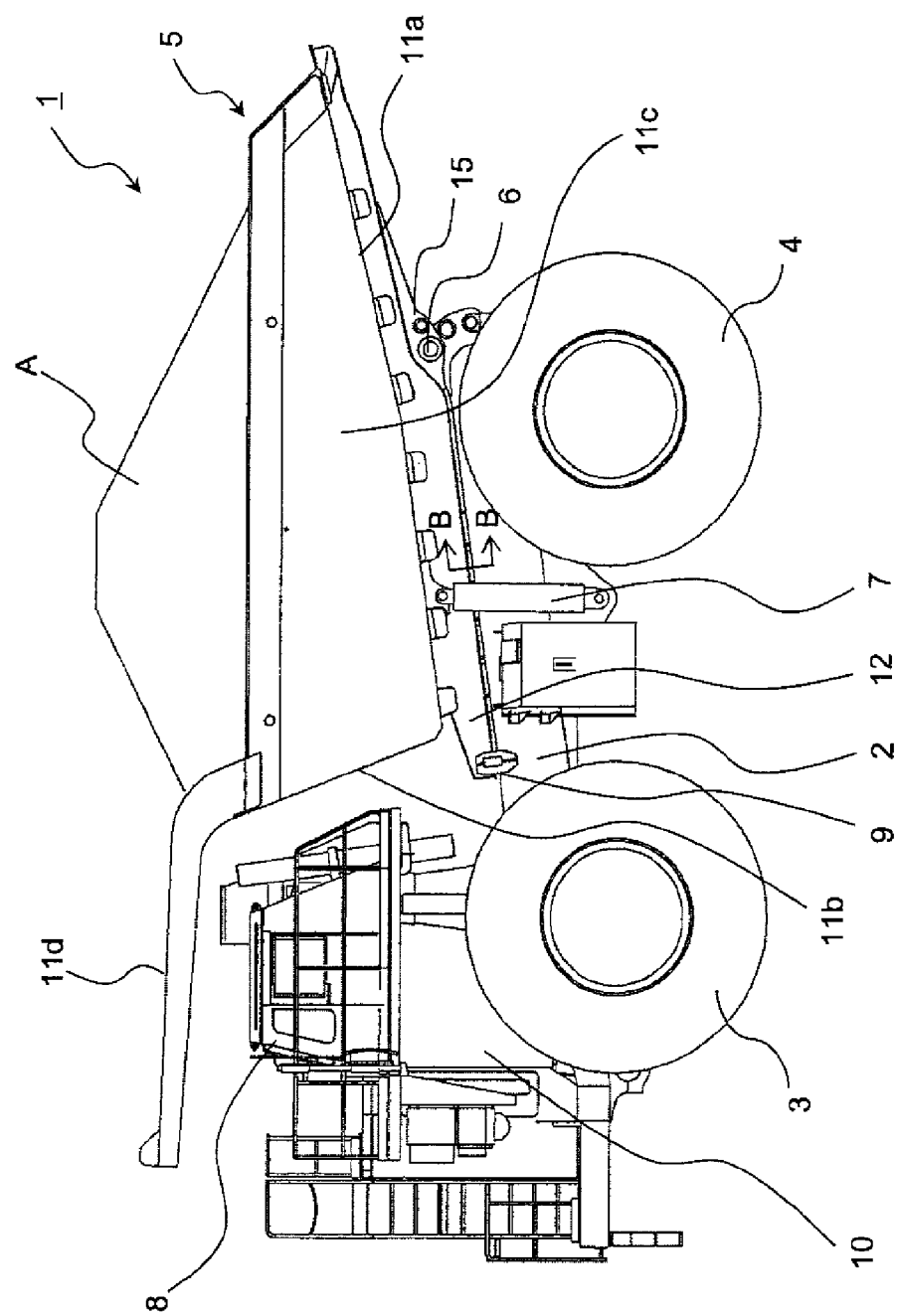
FIG. 1 is a side view of a dump truck according to a first embodiment of the present invention.
Figure 2:
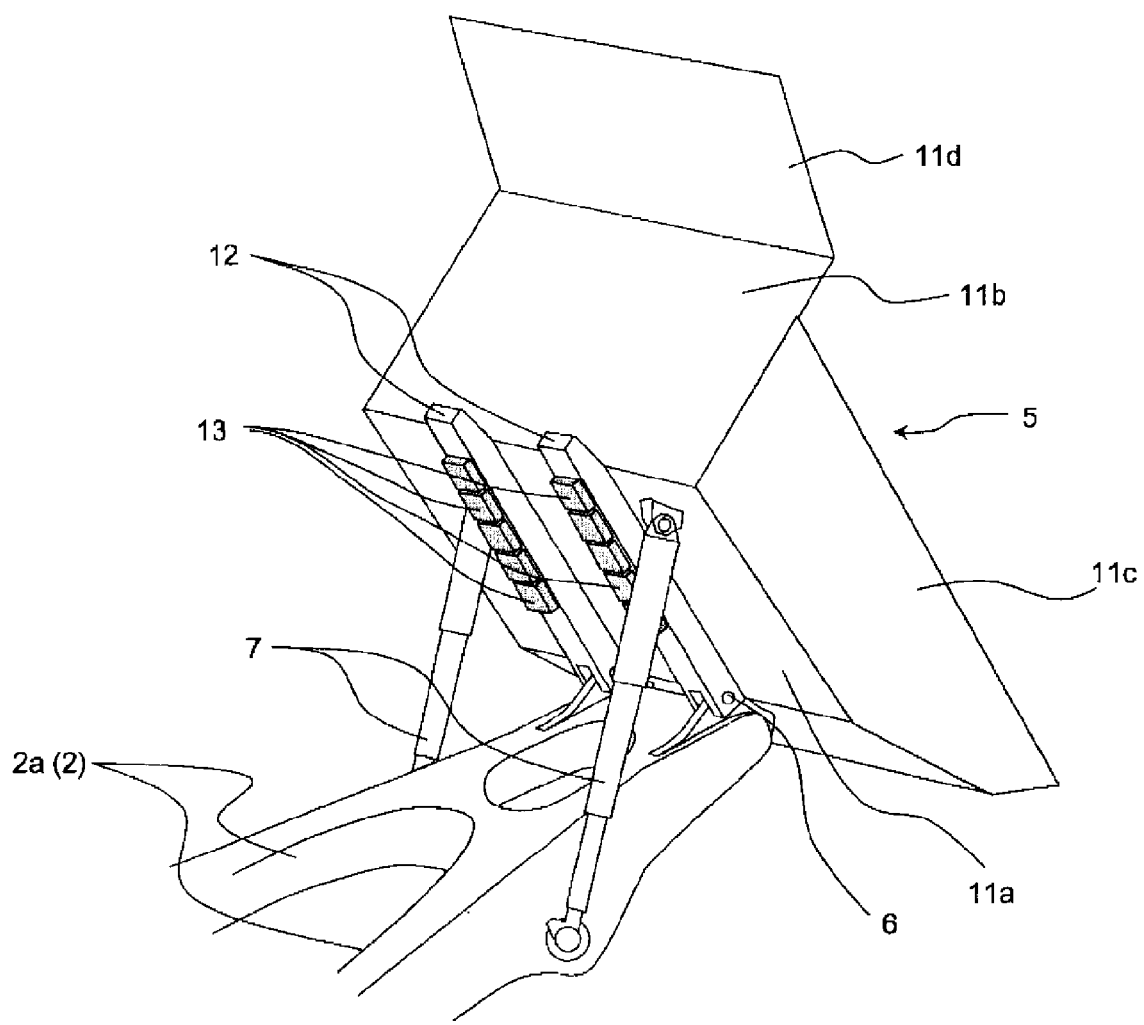
FIG. 2 is a perspective view illustrating the outline of an essential part of the dump truck shown in FIG. 1, with a body being in a raised position.

FIG. 1 is a side view of a dump truck according to a first embodiment of the present invention. FIG. 2 is a perspective view illustrating the outline of an essential part of the dump truck shown in FIG. 1, with a body being in a raised position.

As illustrated in FIG. 1, the dump truck 1 according to the first embodiment is provided with a frame 2, a pair of front wheels 3, a pair of rear wheels 4, and a body 5. The paired front wheels 3 are rotatably attached to lateral opposite ends of a front part of the frame 2, respectively. On the other hand, the paired rear wheels 4 are rotatably attached to lateral opposite ends of a rear part of the frame 2, respectively. Further, the body 5 is a section in which an object A to be hauled, such as earth, sand or crushed stone, is to be loaded, and is mounted on the frame 2 such that it can be raised or lowered.

The frame 2 is a so-called chassis, and as illustrated in FIG. 2, is constructed of a pair of frame members 2a. These paired frame members 2a are in the form of a frame extending in a longitudinal direction, and are constructed such that a pair of rails 12 of the body 5, said paired rails 12 being shown in FIG. 4 and being to be described subsequently herein, are exactly mounted on the paired frame members 2a, respectively, in a position that the body 5 rests on the frame 2. In other words, the paired frame members 2a have a similar shape as the paired rails 12.

On the rear part of the frame 2, hinge pins 6 are attached. These hinge pins 6 act as a center of rotation upon raising and lowering the body 5 (pivoting the body 5 in the up-and-down direction). At locations forward of the hinge pins 6 on the frame 2, a pair of hoist cylinders 7 are attached as hydraulic cylinders that connect the frame 2 and the body 5 with each other. These paired hoist cylinders 7 are attached to a substantially middle part in the longitudinal direction of the frame 2. Above the front wheel 3 on a left side of the frame 2, an operator's cab 8 is arranged as a cab that houses an operator. On the front part of the frame 2, a power unit 10 is arranged with hydraulic equipment accommodated therein.

When the operator drives the hoist cylinders 7 from the operator's cab 8, the body 5 therefore pivots downwardly about the hinge pins 6 in association with a contraction of the hoist cylinders 7, and then assumes a lowered posture to rest on the frame 2. In association with an extension of the hoist cylinders 7, on the other hand, the body 5 pivots upwardly about the hinge pins 6, and then assumes a raised posture (see FIG. 2) to dump out the hauled object A.

It is to be noted that designated at numeral 9 in FIG. 1 are guides which come to contact with side parts of the frame 2 for preventing the body 5 from moving in the lateral direction.

Figure 3:
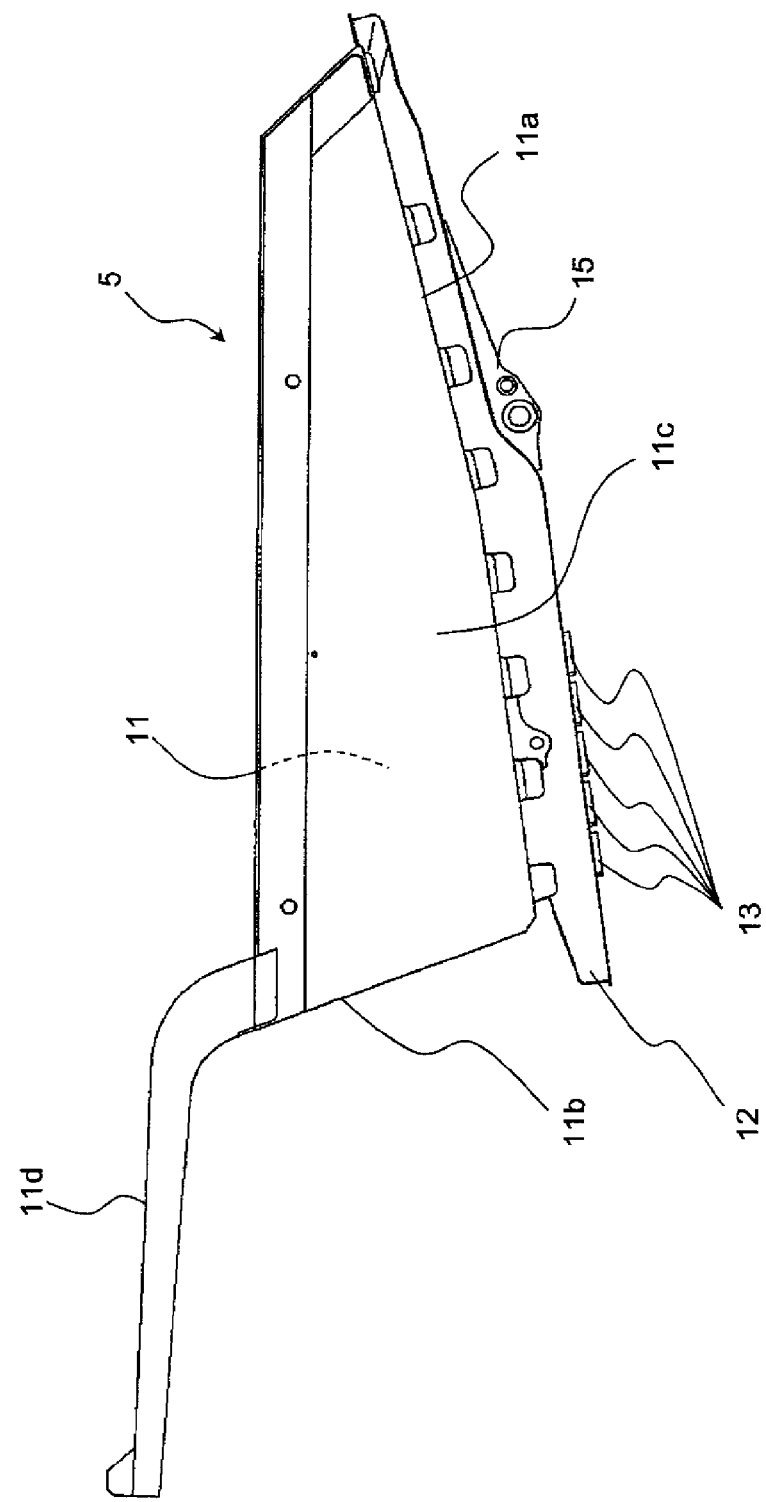
FIG. 3 is a side view of the body of the dump truck shown in FIG. 1.
Figure 4:
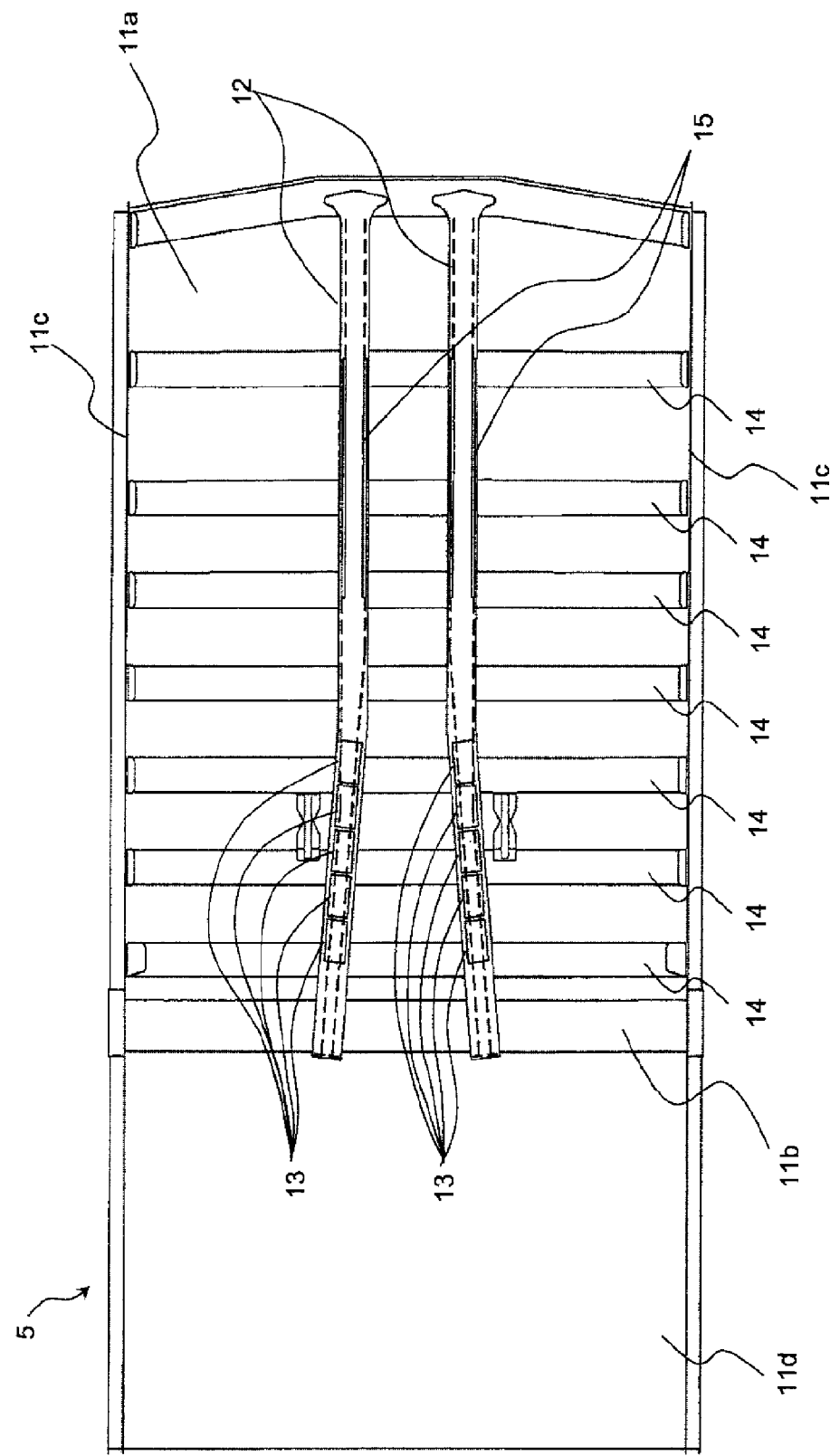
FIG. 4 is a bottom view of the body depicted in FIG. 3.

A detailed description will next be made about the structure of the body 5. FIG. 3 is a side view of the body of the dump truck according to the first embodiment. FIG. 4 is a bottom view of the body depicted in FIG. 3. As shown in FIG. 3 and FIG. 4, the body 5 has a substantially box-like shape, which is constructed by a floor board 11*a*, front board 11*b* and two side boards 11*c*, is open at a top and rear thereof, and defines therein a payload section 11 for loading therein the object A to be hauled. It is to be noted that the floor board 11*a*, front board 11*b* and side walls 11*c* have been joined together by welding.

To an upper part of the front board 11*b*, a substantially board-shaped canopy 11*d* is attached. This canopy 11*d* is attached extending forward such that the canopy 11*d* covers from the upper part of the front board 11*b* to the upper front section of the dump truck 1. Therefore, this canopy 11*d* is arranged to avoid damage to the operator's cab 8, control box 9, power unit 10 and the like, which would otherwise occur by falling of the object A under hauling from the body 5 in the lowered position that the body 5 rests on the frame 2.

As depicted in FIG. 4, the paired, hollow box-shaped rails 12 are attached to the lower surface of the floor board 11*a*, and extend in the longitudinal direction of the frame 2. These paired rails 12 have a similar shape as the respective frame members 2*a* such that they are exactly mounted on upper surfaces of the corresponding frame members 2*a* of the frame 2 in the position that the body 5 rests on the frame 2. Specifically describing the shape of the paired rails 12, the paired rails 12 are in a shape that they extend substantially in parallel to each other from the rear to a middle part of the body 5 and are somewhat bent outwardly from the middle part to the front of the body 5 such that they become apart from each other.

Figure 5:
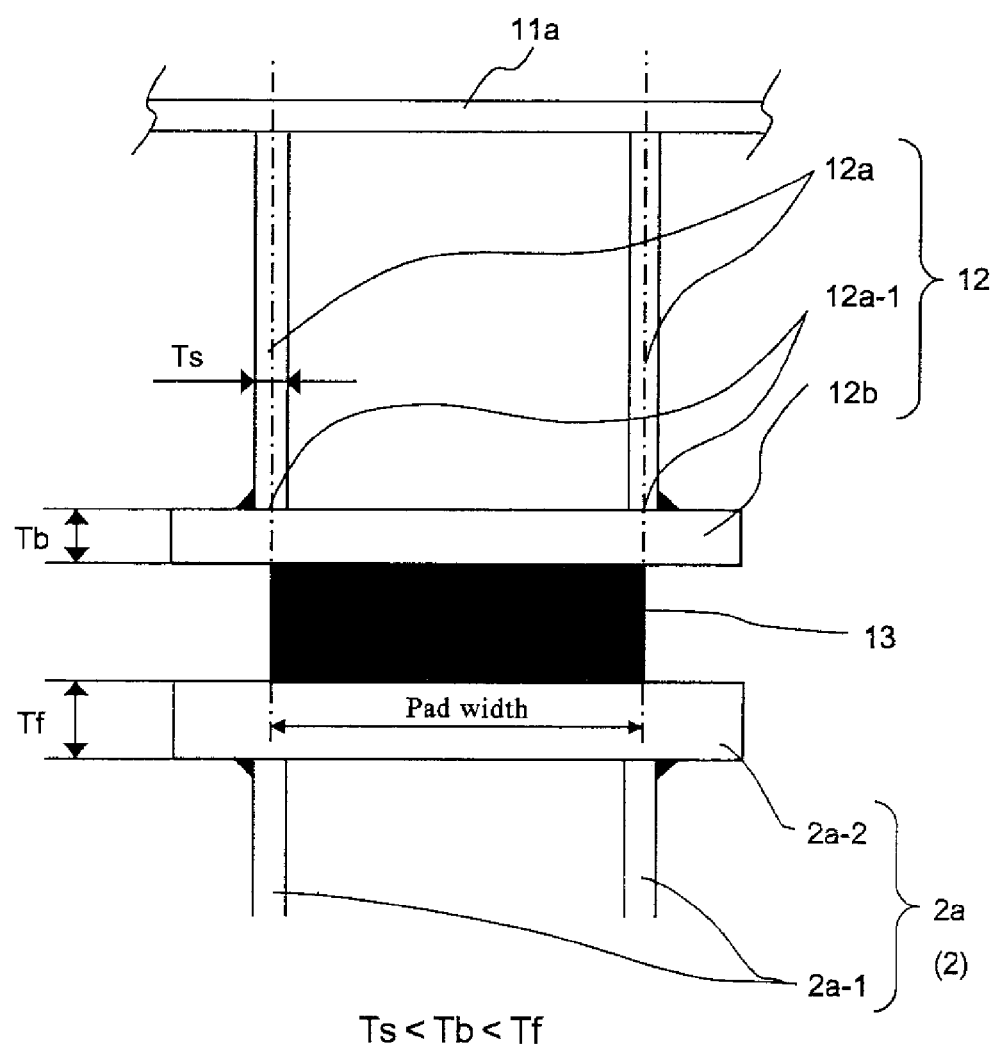
FIG. 5 is a cross-sectional view taken along line B-B of FIG. 1.

A description will next be made about a relationship between the cross-sectional shape and thickness of these paired rails 12. FIG. 5 is a fragmentary cross-sectional view (cross-sectional view taken along line B-B of FIG. 1) of one of the rails 12 and the frame 2 in the lowered position that the body 5 rests on the frame 2. As depicted in FIG. 5, the rail 12 has two side rail plates 12*a* extending downwardly from the floor board 11*a* of the body 5 and a bottom rail plate 12*b* arranged in contact with flat, lower end surfaces 12*a*-1 of these two side rail plates 12*a*, and has a hollow box structure with a space defined by the floor board 11*a* of the body 5, the side rail plates 12*a* and the bottom rail plate 12*b*.

These two side rail plates 12*a* are plate-shaped members having a thickness Ts, and oppose each other with an interval therebetween in the lateral direction of the frame 2. On the other hand, the bottom rail plate 12*b* is a plate-shaped member having a thickness Tb, and has been joined with the two side rail plates 12*a* by welding. High rigidity is assured for the rail 12 formed as described above despite its hollow structure because the two side rail plates 12*a* and the bottom rail plate 12 have been integrated by welding. It is to be noted that the bottom rail plate 12*b* is attached to the lower end surfaces 12*a*-1 of the respective side rail plates 12*a*, with both lateral side edges thereof extending to slightly outer sides beyond outer side surfaces of the corresponding side rail plates 12*a*. In other words, the width of the bottom rail plate 12*b* is a little greater than the interval between the two side rail plates 12*a* plus twice the thickness of the two side rail plates 12*a* (i.e., +Tsx2).

Attached to a lower surface of the bottom rail plate 12*b* are rubber pads 13 which are rectangular in cross-section. Each rail 12 is provided with as many as five rubber pads (see FIGS. 2 to 4). These rubber pads 13 can cushion an impact or impacts to the frame 2 when the body 5 comes to rest on the frame 2 or an object to be hauled is loaded on the body 5, and also allows the body 5 to rest in a stable posture on the frame 2 under a friction force between the rubber pads 13 and the body 5.

Hinge brackets 15 are attached to the rails 12 at positions somewhat rearward of longitudinally middle parts thereof, respectively. Through these hinge brackets 15, the hinge pins 6 are rotatably inserted. These hinge brackets 15, therefore, rotatably support the corresponding hinge pins 6.

To the lower surface of the floor board 11*a* of the body 5, plural, for example, seven stiffeners 14 have been joined by welding such that these stiffeners intersect with the respective rails 12. These stiffeners 14 are horizontally attached at longitudinal intervals to the lower surface of the floor board 11*a*. Each stiffener 14 is formed in a substantially concave channel shape (a hollow structure) in cross-section, and its length is substantially equal to the transverse length (the width) of the floor board 11*a*. The stiffeners 14 are, therefore, arranged over the entirety of the transverse direction of the floor board 11*a*.

On the other hand, the frame members 2*a* of the frame 2 each have two side frame plates 2*a*-1 and a top frame plate 2*a*-2. The two side frame plates 2*a*-1 are arranged with an interval therebetween in the transverse direction of the frame 2, and the top frame plate 2*a*-2 has been joined by welding to upper end surfaces of the two side frame plates 2*a*-1 and has a thickness Tf.

The first embodiment is constructed, for example, with the following dimensions: the thickness Ts of each side rail plate 12*a*=12 mm, the thickness Tb of each bottom rail plate 12*b*=18 mm, and the thickness Tf of each top frame plate 2*a*-2=30 mm, and therefore, the relationship of the respective thicknesses satisfies the "Ts<Tb<Tf" over the entirety of the longitudinal direction of each rail 12. It is, however, only each bottom rail plate 12*b* that has a thickness greater in the first embodiment than that of the corresponding conventional member.

Figure 11:
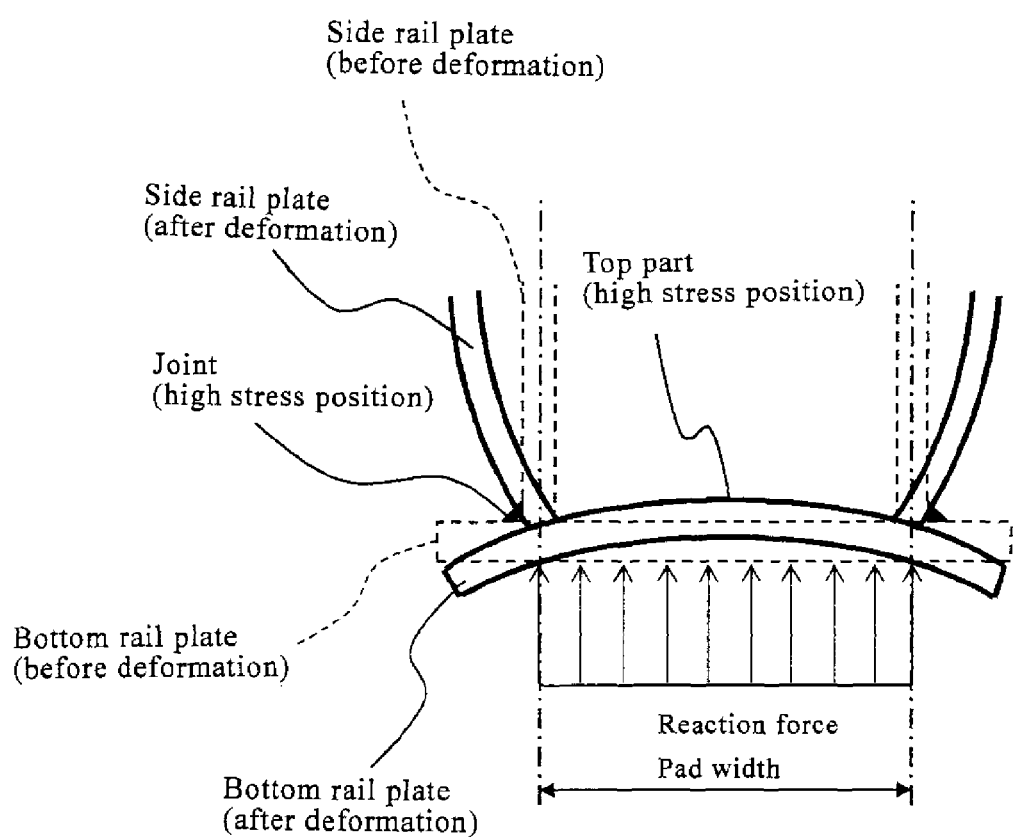
FIG. 11 is a diagram for describing a reaction force received by a rail of a body and deformations of the rail in a conventional dump truck.

As the thickness Tb of each bottom rail plate 12*b* is set greater than the thickness Ts of the associated side rail plates 12*a* in the first embodiment as described above, bending deformations of the bottom rail plate 12*b* in the up-and-down direction become smaller. It is, accordingly, possible to decrease stresses at the joint of each side rail plate 12*a* and its associated bottom rail plate 12*b*, a central part of each bottom rail plate 12*b*, and the like, which have conventionally been high stress positions (see FIG. 11). In addition, the thickness Tb of each bottom rail plate 12*b* alone is set greater in the first embodiment than the thickness of the corresponding conventional member. Therefore, it is also possible to promote mass savings for the body 5 compared with providing each rail with enhanced rigidity by increasing the thicknesses of both the side rail plates 12a and the bottom rail plate 12b.

Moreover, the upper limit of a range in which the thickness Tb of each bottom rail plate 12b can be increased is set to be smaller than the thickness Tf of the corresponding top frame plate 2a-2 in the frame 2 (for example, Tb<30 mm when Tf=30 mm) in the first embodiment. Even if the worst should happen, the rail or rails 12 should, therefore, be damaged before the frame 2. In such a case, the first embodiment enables to use the dump truck by simply repairing the rail or rails 12 or replacing the body 5. Therefore, no large-scale maintenance work is required any longer, thereby making it possible to also reduce maintenance cost.

Figure 6:
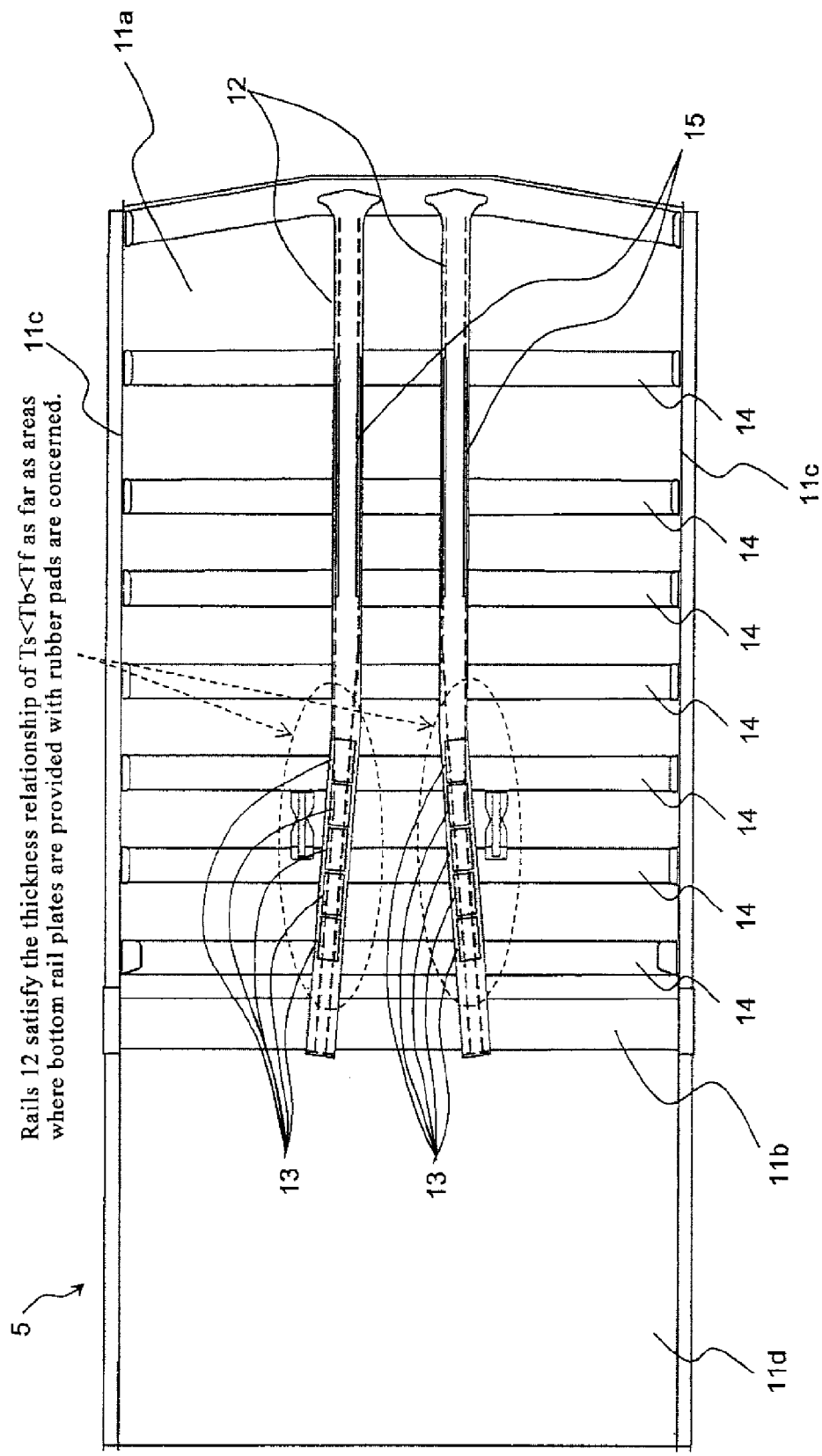
FIG. 6 is a view showing a construction relating to a modification of a lower surface of the body depicted in FIG. 4.

In the first embodiment, each rail 12 is set to satisfy the thickness relationship of "Ts<Tb<Tf" over the entirety thereof. Like a modification shown in FIG. 6, the thickness relationship of "Ts<Tb<Tf" may, however, be satisfied, for example, by constructing the dump truck with the following dimensions: the thickness Ts of each side rail plate 12a=12 mm, the thickness Tb of each bottom rail plate 12b=18 mm, and the thickness Tf of each top frame plate 2a-2=30 mm as far as areas where the bottom rail plates 12b are provided with the rubber pads 13 (the areas surrounded by dashed line in FIG. 6) are concerned, and in areas other than the above-mentioned areas, by setting, for example, plate thicknesses of Ts=Tb=12 mm and Tf=30 mm as before. By doing so, mass savings are feasible for each rail 12 compared with setting the thickness Tb of its bottom rail plate 12b at 18 mm over the entirety thereof.

Second Embodiment

Figure 7:
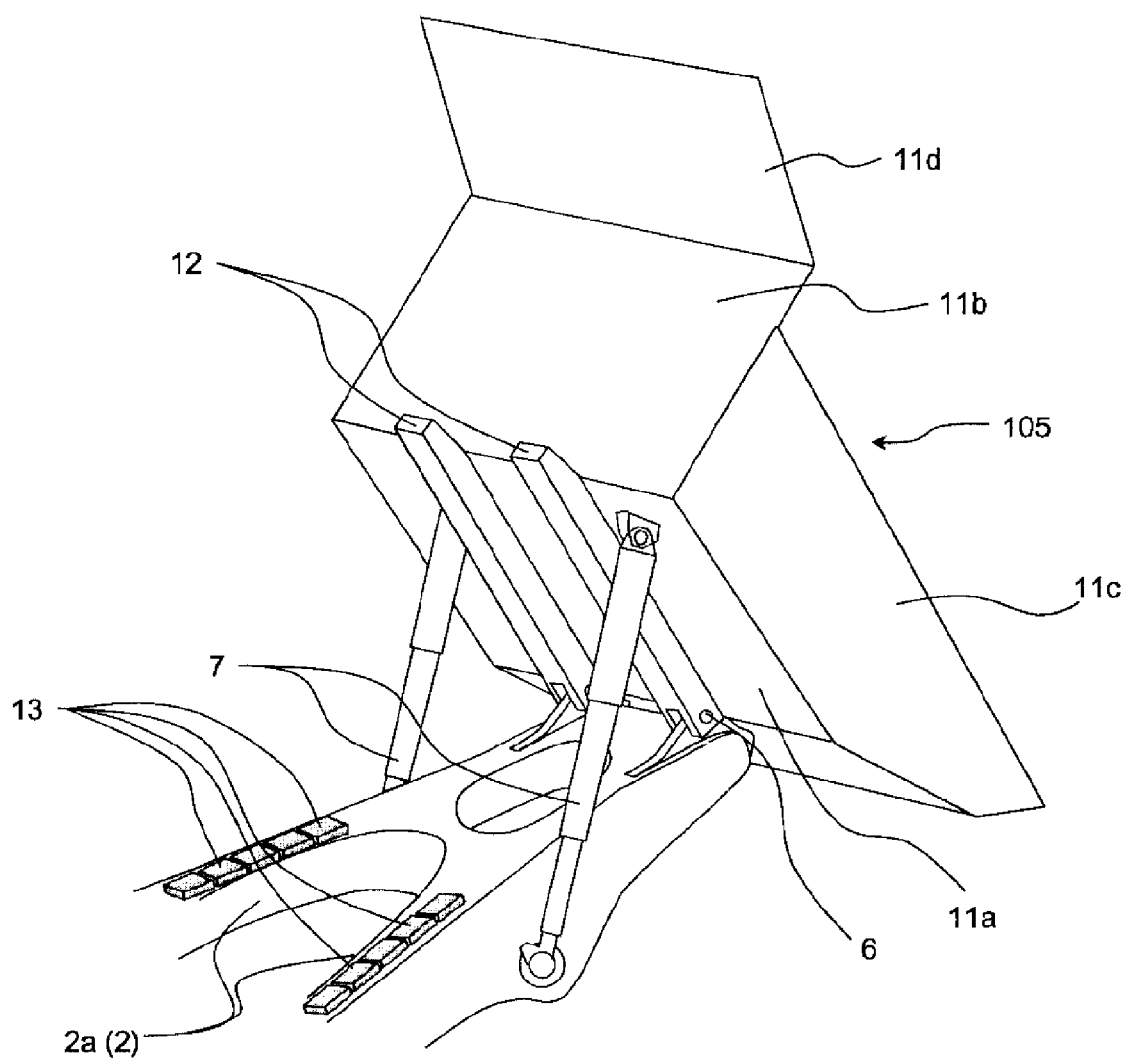
FIG. 7 is a perspective view illustrating the outline of an essential part of a dump truck according to a second embodiment of the present invention, with a body being in a raised position.
Figure 8:
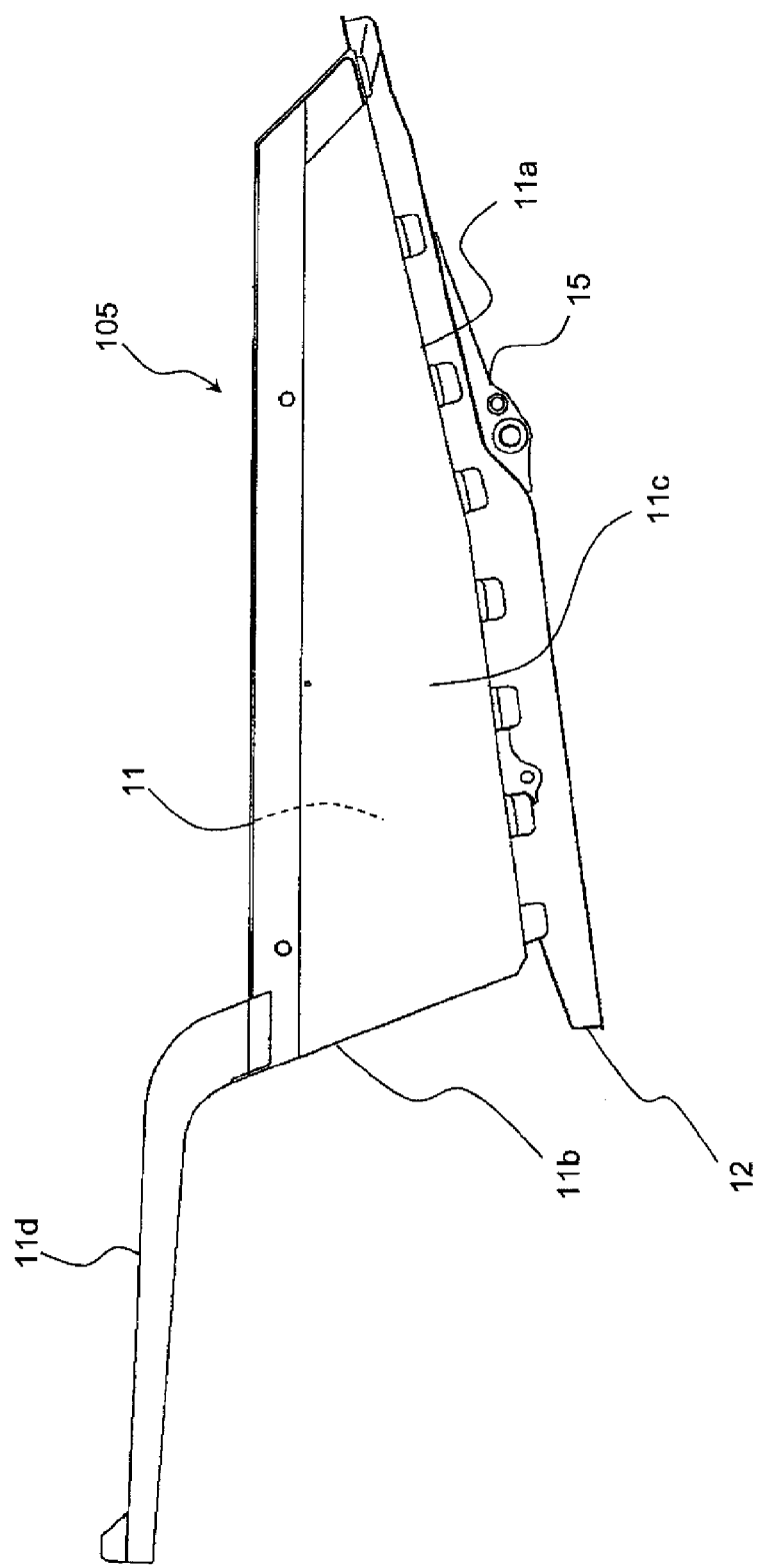
FIG. 8 is a side view of the body of the dump truck illustrated in FIG. 7.
Figure 9:
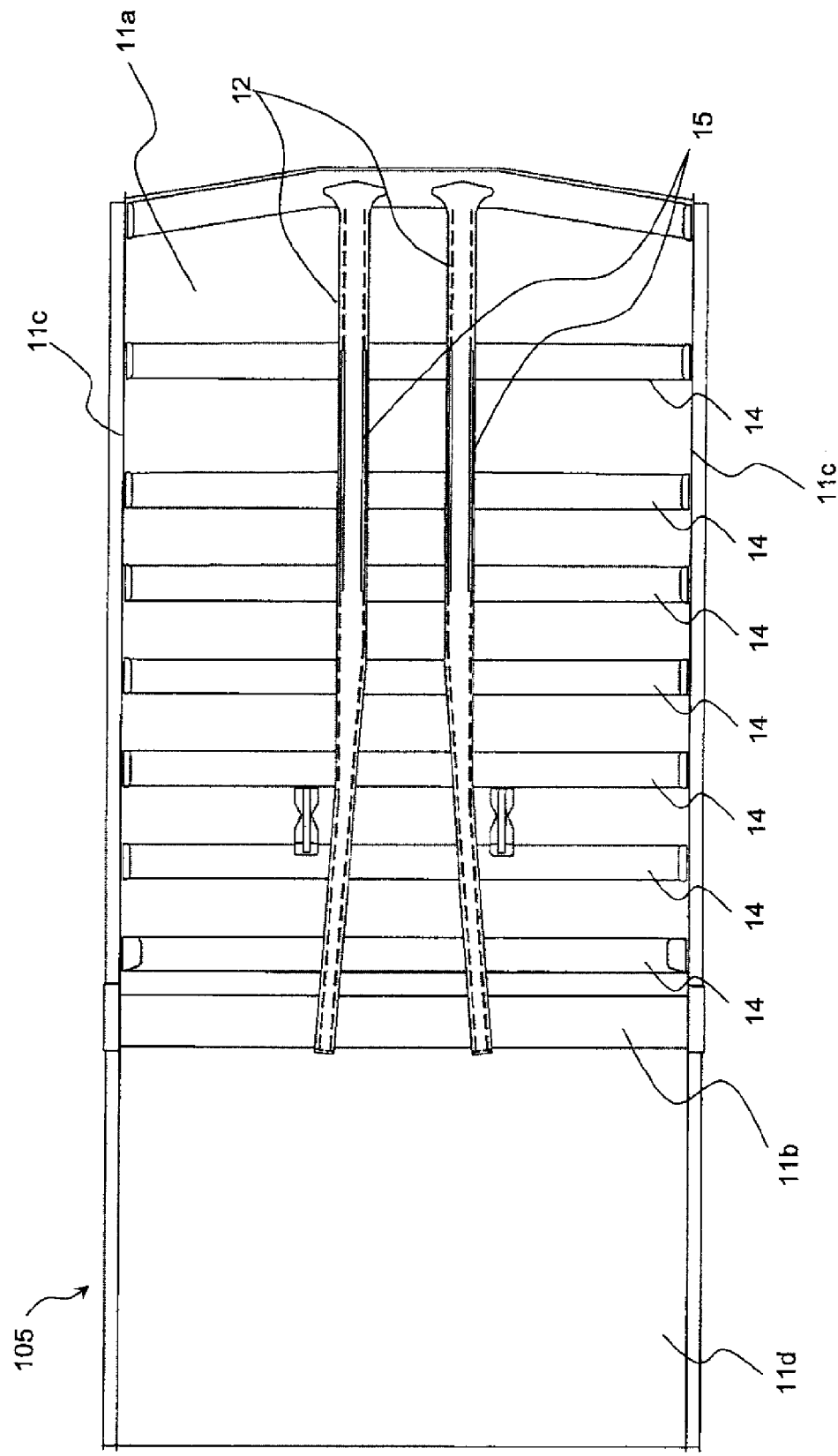
FIG. 9 is a bottom view of the body depicted in FIG. 8.

With reference to FIGS. 7 through 9, a description will next be made about a second embodiment of the present invention. FIG. 7 is a perspective view illustrating the outline of an essential part of a dump truck according to the second embodiment of the present invention, with a body being in a raised position, FIG. 8 is a side view of the body of the dump truck according to the second embodiment, and FIG. 9 is a bottom view of the body of the dump truck according the second embodiment.

The second embodiment is different from the first embodiment in that the rubber pads 13 are attached to the frame 2, and the remaining construction is the same as the first embodiment. Therefore, this difference will be dealt with in the following description, and like elements of structure will be designated by like reference signs and their description will be omitted.

As illustrated in FIGS. 7 through 9, in the second embodiment, the rubber pads 13 are nor arranged on the lower surfaces of the rails 12 of a body 105, but the rubber pads 13 are attached to the upper surfaces of the top frame plates 2a-2 (see FIG. 5), which make up the frame 2, as many as five per top frame plate. This second embodiment is also constructed with the following dimensions: the thickness Ts of each side rail plate 12a=12 mm, the thickness Tb of each bottom rail plate 12b=18 mm, and the thickness Tf of each top frame plate 2a-2=30 mm. The dimensional relationship of these thicknesses satisfies "Ts<Tb<Tf" over the longitudinal entirety of each rail 12.

According to the second embodiment of the present invention constructed as described above, similar advantageous effects as in the first embodiment can be obtained. Described specifically, it is possible to decrease stresses at the joints of each side rail plate 12a and its associated bottom rail plate 12b, a central part of each bottom rail plate 12b, and the like, which have conventionally been high stress positions. Moreover, only the thickness Tb of each bottom rail plate 12b is made greater than the corresponding conventional member in the second embodiment. It is, therefore, possible to promote mass savings for the body 105 compared with making greater both the thickness of the side rail plates and the thickness of the bottom rail plates 12b to enhance the rigidity. Even if the worst should happen, the rail or rails 12 should, therefore, be damaged before the frame 2. In such a case, the second embodiment enables to use the dump truck by simply repairing the rail or rails 12 or replacing the body 105. Therefore, no large-scale maintenance work is required any longer, thereby making it possible to also reduce maintenance cost.

Figure 10:
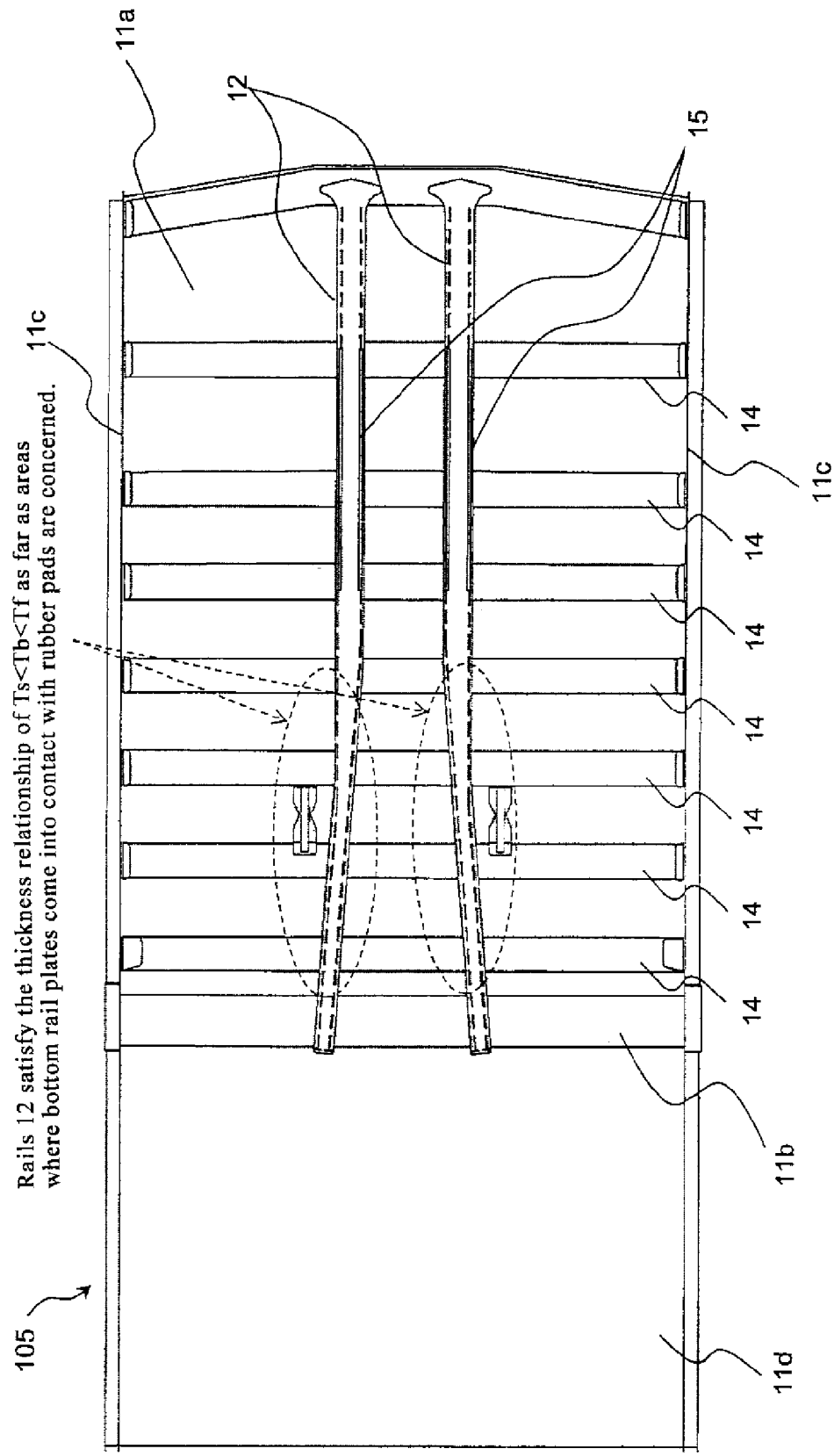
FIG. 10 is a view showing a construction relating to a modification of a lower surface of the body depicted in FIG. 9.

In the second embodiment, each rail 12 is set to satisfy the thickness relationship of "Ts<Tb<Tf" over the entirety thereof. Like a modification shown in FIG. 10, for example, the thickness relationship of "Ts<Tb<Tf" may, however, be satisfied by constructing the dump truck with the following dimensions: the thickness Ts of each side rail plate 12a=12 mm, the thickness Tb of each bottom rail plate 12b=18 mm, and the thickness Tf of each top frame plate 2a-2=30 mm as far as areas where the rails 12 come to contact with the rubber pads 13 (the areas surrounded by dashed line in FIG. 10) are concerned, and in areas other than the above-mentioned areas, by setting, for example, plate thicknesses of Ts=Tb=12 mm and Tf=30 mm as before. By doing so, mass savings are feasible for each rail 12 compared with setting the thickness Tb of its bottom rail plate 12b at 18 mm over the entirety thereof.

In the above-described first and second embodiments, the constructions provided with the rubber pads 13 are exemplified. Even in the case of such a construction that the body 5 or 105 comes into direct contact with the frame 2 without the arrangement of the rubber pads 13, similar advantageous effects as in the first and second embodiments can also be exhibited provided that the thickness Ts of the side rail plates 12a, the thickness Tb of the bottom rail plates 12b and the thickness Tf of the top frame plates 2a-2 are set to satisfy the relationship of "Ts<Tb<Tf".

In the first embodiment, it is also possible to adopt a construction that arranges a clearance adjusting shim between each bottom rail plate 12b and its corresponding rubber pads 13, and in the second embodiment, it is also possible to adopt a construction that arranges a clearance adjusting shim between each top frame plate 2a-2 and its corresponding rubber pads 13. In this case, the clearance between the body 5 or 105 and the frame 2 can be adjusted by such shims, so that a localized concentration of stress on the rails 12 can be prevented. There is also another advantage that the body 5 or 105 is allowed to rest in a stable posture on the frame 2.

EXPLANATION OF REFERENCES

1 Dump truck
2 Frame
5 Body
6 Hinge pin
11a Floor board of the body
12 Rail
12a Side rail plate
12a-1 Lower end surface of the side rail plate
12b Bottom rail plate
13 Rubber pad
105 Body

The invention claimed is:

1. A dump truck (1) provided with a frame (2) having a top frame plate (2a-2), hinge pins (6) arranged on a rear part of the frame, and a body (5) mounted tiltably in an up-and-down direction relative to the frame via the hinge pins, characterized in that:
- the body (5) is provided on a lower surface of a floor board (11a) thereof with a rail (12) along a longitudinal direction of the frame (2),
- the rail (12) is a hollow structure member comprised of two side rail plates (12a), which extend downwardly from the lower surface of the floor board (11a) of the body (5) and oppose each other with an interval therebetween in a lateral direction of the frame (2), and a bottom rail plate (12b), which is arranged in contact with respective lower end surfaces (12a-1) of the two side rail plates (12a), and
- the dump truck (1) satisfies a relationship of $Ts<Tb<Tf$, where $Ts$ is a thickness of the side rail plates (12a), $Tb$ is a thickness of the bottom rail plate (12b), and $Tf$ is a thickness of the top frame plate (2a-2) of the frame (2).

2. The dump truck according to claim 1, wherein:
- the bottom rail plate (12b) is provided with plural rubber pads (13) such that the rubber pads are in contact with the frame (2) when the body (5) is in a position resting on the frame (2), and
- the rail (12) is constructed to satisfy the relationship of $Ts<Tb<Tf$ as far as an area where the bottom rail plate (12b) is provided with the plural rubber pads (13) is concerned.

3. The dump truck according to claim 1, wherein:
- the frame (2) is provided with plural rubber pads (13) such that the rubber pads are in contact with the bottom rail plate (12b) when the body (5) is in a position resting on the frame (2), and
- the rail (12) is constructed to satisfy the relationship of $Ts<Tb<Tf$ as far as an area where the bottom rail plate (12b) comes into contact with the plural rubber pads (13) is concerned.

* * * * *